United States Patent Office 3,448,623
Patented June 10, 1969

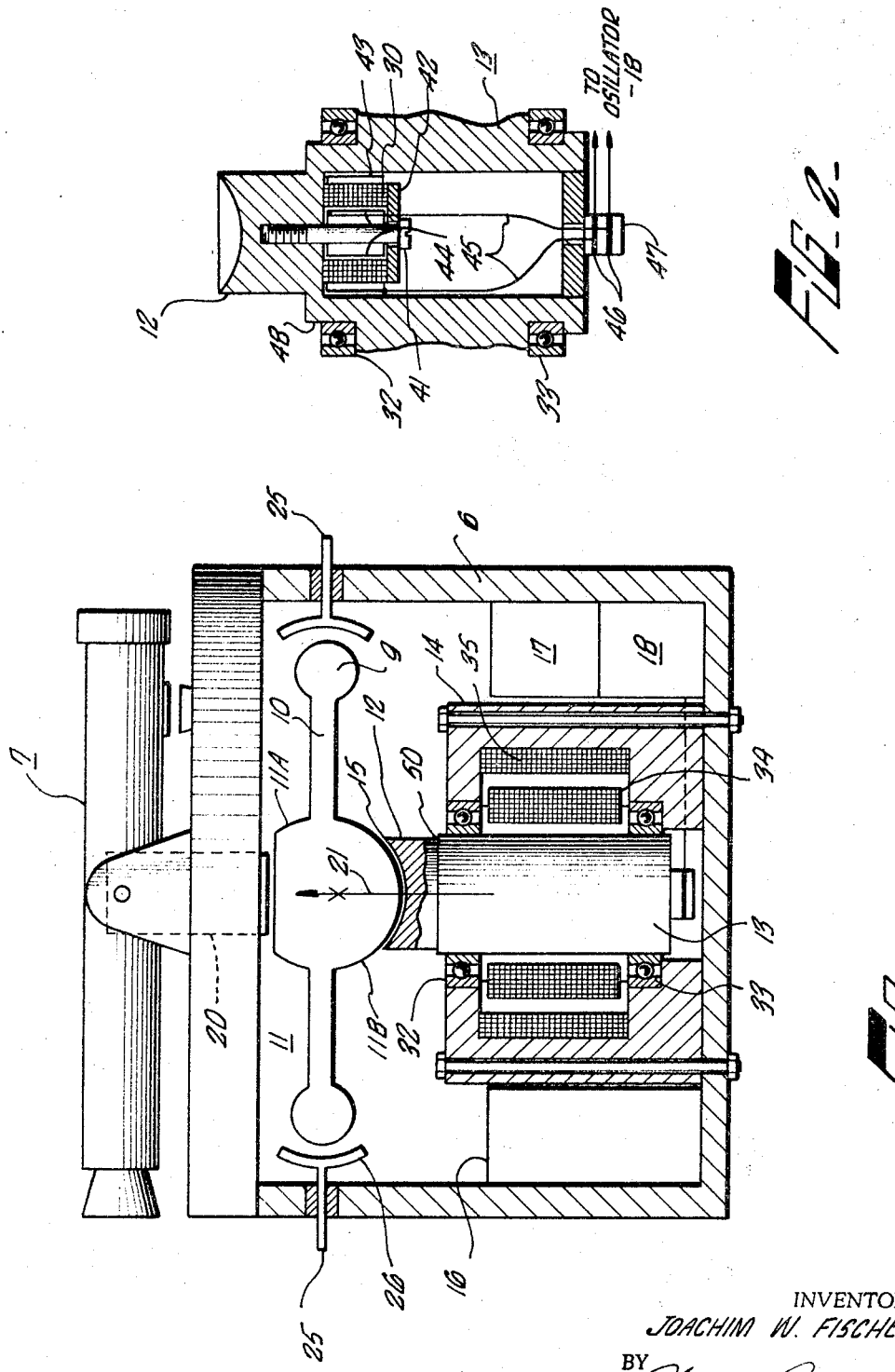

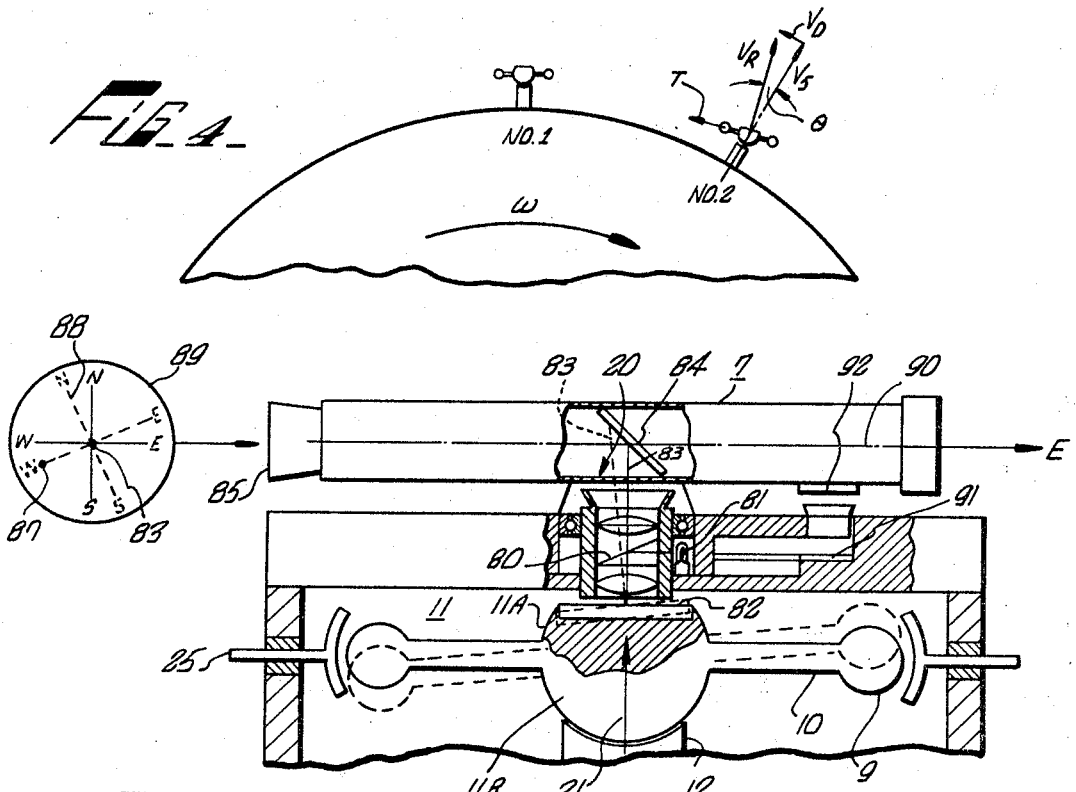
FIG. 4
FIG. 4A
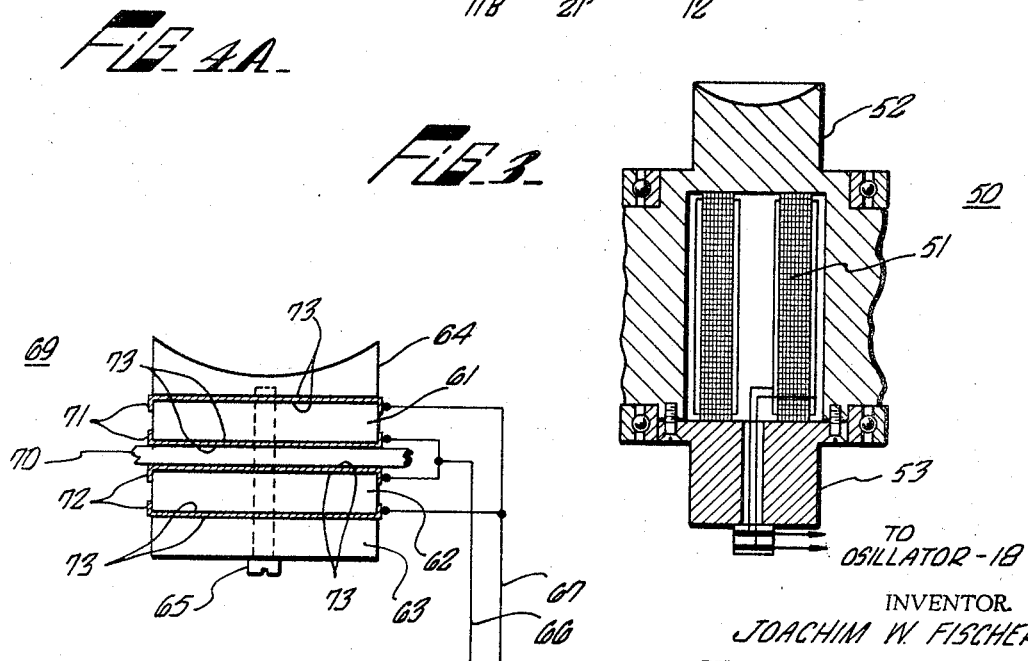
FIG. 3
FIG. 5
INVENTOR.
JOACHIM W. FISCHER
BY
*Christie, Parker & Hale*
ATTORNEYS

3,448,623
MERIDIAN-SEEKING GYROSCOPE EMPLOYING A SIMULTANEOUSLY ROTATING AND VIBRATING BASE
Joachim W. Fischer, Los Angeles, Calif., assignor to Lear Siegler, Inc., Santa Monica, Calif., a corporation of Delaware
Filed Oct. 8, 1965, Ser. No. 494,022
Int. Cl. G01c 19/34, 19/40
U.S. Cl. 74—5          9 Claims

ABSTRACT OF THE DISCLOSURE

The invention disclosed herein relates in general to gyroscopes and more particularly relates to a north-seeking gyroscope mounted for universal movement on a base which simultaneously rotates and vibrates. Base rotation, through contact friction with the gyroscope rotor, brings the rotor up to a predetermined rotational speed about a spin axis, and thereafter base vibration takes place that is coaxial to the spin axis and at a frequency selected to form and trap a supporting film of air between the gyroscope mounting and the base.

Description of the prior art

Prior art north-seeking gyroscopes, of the type described herein, have in the past consisted of various arrangements for supporting the gyroscope rotor with respect to a rotating frame of one type or another. These prior art gyroscopes make use of the well-known gyroscopic principle that a gyroscope rotor when spinning about its major axis of inertia and coupled by viscous friction to a rotating drive shaft, develops a so called "lag" angle relative to its case. This lag angle occurs when the drive shaft, which is fixed with respect to the earth, is rotated by the turning of the earth about an axis orthogonal to the spin axis of the drive shaft and therefore orthogonal to the original position of the spin axis of the rotor, which tends to remain fixed with respect to space. This lag angle, in a manner more fully described hereinafter, is measurable and may be employed to determine the local meridian.

Prior art gyroscopes which have taken advantage of this principle have consisted of two concentric spheres. The outer sphere must be hermetically sealed and provided with inlet and outlet ports for introducing pressurized fluid into the space between the spheres. In prior art operations the inner sphere serves as a gyroscope rotor. The intended purpose of the pressurized fluid is to prevent the rotating inner sphere from touching the outer sphere. Viscous friction between the inner sphere and the outer sphere develops the foregoing lag angle from which the local meridian may be determined.

The foregoing and other prior art arrangements require a complex supply of pressurized fluid such as air which is disadvantageous in that numerous applications for meridian-seeking gyroscopes require them to be low cost, small, light weight and readily portable instruments. In general, the pressurized air source of the prior art gyroscopes prohibits them from satisfying these requirements.

The prior art inner sphere is limited to a rotor design of an entire spherical surface. This surface is difficult to achieve at the precise tolerances required. Also a relatively large lag angle is necessary for accurate determinations of the meridian, and this lag angle is most advantageously achieved by employing a rotor design having small mass and a large major moment of inertia. The spheircal rotor design of the prior art, although satisfactory, is greatly lacking in meeting these requirements.

Pressurized air supplied to the hermetically sealed outer sphere of the prior art must be pure, dry and supplied at a constant pressure, all of which further complicates and increases the cost, size, and complexity of such prior art instruments. Furthermore, turbine torques and other torque due to air turbulence are caused by the pressurized air when it passes through the space between the rotor and the outer sphere. These torques are random and unpredictable, and may seriously affect the accuracy of meridian determinations by the gyroscope.

Summary of the invention

The foregoing disadvantages of the prior art are avoided by the principles of this invention wherein random torques are eliminated by employing a drive shaft capable of simultaneously rotating and vibrating, so as to support a gyroscope rotor, having small mass and a large major moment of inertia, on a film of air and to develop a lag angle sufficient for accurate meridian determinations. The north-seeking gyroscope of this invention comprises a rotor rotating about a spin axis. The rotor is a thin, flat circular disk having a pair of convex hemispherical protrusions above and below the disk at its center point. The underside hemispherical protrusion is concentric with an upper concave spherical surface of a base upon which the rotor is initially seated when it is not caged. The base, at its end opposite the concave spherical surface, is coupled to a piezoelectric element which in turn is coupled to a rotatable shaft of a motor. The motor is connected to a first source of energy for rotation, and the piepoelectric element is connected to a second source of energy for vibration. Initially, before the rotor support is vibrated, the motor rotates the shaft at a predetermined speed, and the gyroscope rotor is constrained by coulomb friction between it and the base in which it is seated to spin at this same speed. Thereafter the pieloelectric element is induced to vibrate in an axial direction by an appropriate signal from the second source. This vibrating piezoelectric element causes a film of air to support the spinning gyroscope rotor. This air, or gas, film exhibits a small viscous friction between the spinning gyroscope rotor and the rotating base. The horizontal component of the earth's velocity together with this viscous friction causes the gyroscope rotor to lag in the earth's east-west plane. This lag is represented by an angle that can be monitored by a suitable read-out means to readily provide a visual indication of the direction of the meridian plane.

In one preferred embodiment the piezoelectric element is plated by suitable conductive material which extends beyond the base and is available for connection with leads leading to the second source.

In another preferred embodiment of this invention, the rotor is substantially a thin, flat disc with a thickened peripheral rim approximately in the form of a toroid, and a center section in the form of a pair of convex hemispherical protrusions located at the disc's center. The upper protrusion has a top segment of the spherical portion removed and a flat mirror in mounted thereon to provide a reflective surface for light beams that are displayed on a screen in a read-out device.

Description of the drawings

A more complete understanding of the principles and features of this invention may be gained by reference to the accompanying drawings in which:

FIG. 1 is a partial cross-section elevation of a north-seeking gyroscope having a rotor universally mounted on a base providing simultaneous rotation and vibration to said rotor in accordance with the principles of this invention;

FIG. 2 is a side elevation of one transducer employing a mounting arrangement for a piezoelectric ceramic as the vibration generating element for a base coupled to a drive shaft rotatably driven by an electric motor;

FIG. 3 is a side elevation of an alternative mounting arrangement of another transducer within the principles of this invention;

FIGS. 4 and 4A are respectively symbolic illustrations helpful in promoting a clear understanding of this invention and one possible read-out technique for meridian determinations; and FIG. 5 is an improved structure for connecting a piezoelectric ceramic to a signal source.

Description of the preferred embodiment

Turning now to FIG. 1, the gyroscope instrument of this invention is shown comprising, in cross section, a gyro wheel, or rotor, 11 which is universally supported on a base 12 affixed to a shaft 13 of an electric motor 14. The electric motor 14 and the gyroscope rotor 11, along with power supplies 16, 17 and 18, are located in a suitable housing or container 6. Mounted on top of housing 6 is one possible configuration of a combined telescope and microscope 7 which houses an autocollimator 20. Components 7 and 20 are not shown in cross section in FIG. 1, but are described in more detail hereinafter with respect to FIG. 4A.

Rotor 11 comprises a circular thin flat disc 10 with a thickened peripheral torroidal rim 9. Two convex hemispheres 11A and 11B protrude from the center of disc 10. Rotor 11, thus designed, includes a large axial major moment of inertia, shown symbolically by arrow 21, and a small transverse minor moment of inertia. This gyro rotor 11 is dynamically balanced with the center of gravity of the gyroscope rotor 11 located as indicated by the X in the center of the sphere.

A caging mechanism 25 is mounted in the housing 6 at appropriate spots around the perimeter 9 of the gyroscope rotor 11. This caging mechanism 25 is a circular shoe with an inner groove 26 matched to receive the peripheral rim 9. Caging mechanism 25 may be moved radially inwardly or outwardly by any suitable means such as a piston, a lever, or a cam (not shown). When moved radially inward, groove 26 seizes rim 9 and holds the rotor hemisphere 11B away from surface 15 of base 12. When uncaged, by an outward radial movement, the rotor 11 is allowed to seat on the concave portion of base 12, in the absence of any axial oscillation.

Base 12 has a concave spherical surface 15 that is universally mated with the hemispherical surface 11B of rotor 11. This base 12 may be any suitable rigid material. It, in turn, as shown in more detail in FIG. 2 is supported on a cylinder 30 that is located in the hollow drive shaft 13. Cylinder 30 is a piezoelectrical ceramic element which is utilized to provide vertical, of axial, vibration to base 12. Cylinder 30 is coupled by suitable means such as a compression bolt, epoxy or other bonding agent to the hollow drive shaft 13, FIG. 1. Drive shaft 13 is supported on two opposed bearings 32 and 33. These bearings are arranged to provide a minimum amount of friction for rotation of shaft 13. The drive shaft 13 includes an armature winding 34 located within a stator winding 35 of motor 14.

In operation the gyroscope rotor 11 is subjected to two different driving forces. The initial driving force produces a rotational movement, to bring the gyroscope rotor 11 up to a predetermined rotational speed. This speed is achieved by coulomb friction developed by contact between the uncaged rotor 11 and base 12 as base 12 and shaft 13 is driven by motor 14.

Once the gyroscope rotor 11 is spinning at the operating speed of motor 14, a second driving force is applied to gyroscope rotor 11. This second force is a supporting force to move rotor 11 away from physical contact with base 12. Thus, as final motor speed is achieved by rotor 11, the piezoelectric element 30 is energized to provide a vertical vibration. This vibration develops a low friction film of air in the interspace between the concave spherical surface 15 of base 12 and the similarly curved convex hemispherical surface 11B of gyroscope rotor 11. The manner in which the vertical vibrations of base 12 are generated are described in connection with FIG. 2 wherein one possible mounting arrangement for a piezoelectric ceramic is shown.

Ceramic cylinder 30, FIG. 2, is shown fastened to the lower flat plane surface of base 12 by any suitable adhesive and is placed under compression by a bolt and washer 41, 42. The ceramic cylinder 30 may be any suitable piezoelectric ceramic or crystal, which is suitable for a transducer operation. Some such suitable transducer materials, to mention only a few, include ammonium tartrate, lithium sulphate, quartz, Rochelle salt, tourmaline, ammonium dihydrogen phosphate and various pre-polarized ceramics, such as polycrystalline and lead zirconate ceramic.

A pair of cylindrical electrodes 43 and 44 surround the inner and outer surfaces of ceramic cylinder 30. These electrodes 43, 44 serve to provide a means for application of an electric field to the piezoelectric ceramic cylinder 30. Signals to these electrodes are supplied by a pair of leads 45 which are also housed in the hollow drive shaft 13. Leads 45 terminate at a pair of slip-rings 46 located on stub 47 of drive shaft 13. Slip-rings 46 are connected to any suitable source of electrical energy 18 for transmitting energy to electrodes 43 and 44 during rotation of shaft 13.

One possible source of electrical energy within the principles of this invention, is shown in block form in FIG. 1 and includes an amplifier 17 and an oscillator 18. The frequency of oscillator 18 is chosen to produce an alternating electric field which is applied across the thickness of cylinder 30. This electric field applied by the oscillator 18 results from an alternating signal having a frequency selected to match the natural frequency of the composite transducer formed by base 12, cylinder 30, washer 42 and bolt 41. Ceramic cylinder 30 deforms both radially and axially in opposite directions for each of the opposite polarity signals supplied by oscillator 18. These deformations vibrate base 12 in a vertical direction at the same frequency as the signal output of oscillator 18. This composite transducer may be self-excited instead of employing oscillator 18 as an additional component. Self-excitation is described in detail in a patent application by Harry Nils Eklund, filed on Sept. 7, 1965, having Ser. No. 485,333, and assigned to the same assignee as the present application.

Regardless of the type of ceramic excitation employed, however, vibration of base 12 is enhanced if the frequency of the field matches the lowest axial natural frequency for the transducer. The lowest axial natural frequency of the transducer is that frequency which is associated with the quarter-wave mode of oscillation of cylinder 30. Accordingly, base 12 is secured by a collar 48 to the top of the hollow drive shaft 13 at its zero vibration, or nodal plane. Thus assembled, the transducer of FIG. 2 comprises a half-wave transducer.

Other forms of transducers and different mounting arrangements are equally within the principles of this invention. For example, a full-wave transducer 50 is shown in FIG. 3. In this figure a half-wave ceramic cylinder 51 is sandwiched between two quarter-wave rigid backing plates 52 and 53.

Transducer 50 of FIG. 3 is one possible alternative for the north-seeking gyroscope of this invention. In FIG. 5 another possible configuration of the transducer assembly 69 is shown. It consists of two thin piezoelectric discs 61 and 62. The backing 63 and the supporting base 64 are made of suitable rigid material, the length of which is chosen to be ¼ wavelength at the lowest operating natural frequency of the composite transducer 69. A compression bolt 65 keeps the ceramic discs 61 and 62 under a compression bias. A mounting flange 70 is provided at the nodal plane of transducer 69. An alternating field across the piezoelectric ceramic, which causes it to expand and contract, is supplied via leads 66 and 67, which in turn may be connected to the slip-rings and the power supply described in connection with the description of FIG. 2.

In prior art transducers wire mesh or punched metal foil has been cemented to the hollow ceramic or to ceramic discs and used as electrodes. Such prior art configurations do not provide intimate electric contact between the surface of the ceramic and the base, because the cement acts as a dielectric. Thus, this cement introduces appreciable voltage drop across the ceramic and reduces the efficiency of the transducer. The objectionable layer of cement is avoided by transducer 69 wherein electrode pairs 71 and 72 are plated directly to the piezoelectric ceramic discs by any well-known electroless plating process or by vacuum deposition of a suitable highly conductive material. The thickness of the electrodes is built up to any desired magnitude by an electrolytical process. The piezoelectrical ceramic discs 61 and 62 are then connected to backing 63 and supporting base 64 by high strength electrically conductive adhesive layers 73. Leads 66 and 67 are connected to the electrodes by clamping, soldering, or otherwise so that they make good electrical contact with the electrode surfaces extending down the side of discs 61 and 62.

Numerous other forms of transducers, it is to be understood, are equally within the spirit and scope of this invention. For example, the vibration of base 12 may be achieved by magnetostriction, electro-magnetic oscillation or mechanically induced oscillation.

If magnetostriction is employed, the vertical vibration necessary to create a squeeze film of air would be generated by employing a bearing support shaft made of a ferro magnetic material having a D.C. magnetic bias. A magnetic alternating current field of the same frequency as the resonant longitudinal frequency of the rotating bearing shaft can be fed through any suitable solenoid to set the rotating shaft into the desired oscillation of vibration. Power to the oscillating shaft is supplied by slip-range as already described.

If electromagnetic vibration is to be utilized, the rotor is mounted in radial bearings and the whole bearing assembly is tuned to a driving frequency. This driving frequency is determined by the windings of the drive motor being disposed in a manner that the field vector of the motor is inclined and produces vertical components which generate a push-pull force along the vertical drive axis of the rotating drive shaft.

If mechanically induced oscillation is employed, the rotor bearings are of the radial type and a thrust bearing is employed to carry the axial load of the drive shaft. The end face of this axial bearing is appropriately shaped so that when the motor is running at its final speed, oscillations at the resonant frequency of the drive shaft are induced by the shape of the end face of the thrust bearing.

In any event, however, and regardless of the type of vibration employed, the operation of the north-seeking gyroscope of this invention employs a drive shaft which exhibits two distinct and simultaneous forces on the gyroscope rotor. According to the principles of this invention, the rotating drive shaft 13 of FIG. 1 brings the gyroscope rotor 11 up to speed. Thereafter the ceramic cylinder 30 vibrates base 12 in a vertical, i.e. in an axial direction. The universal mounting formed between the surface 11B of the gyroscope rotor and the surface 15 of the vibrating base, develops a so-called squeeze bearing in the form of a thin film of air. This film of air produces a supporting force for the north-seeking gyroscope.

The above-described squeeze bearing phenomenon is explainable in terms of the isothermal change of a gas known as "Boyle's law." Thus, when the two parallel surfaces, namely, that of the gyroscope rotor 11B and the base surface 15 are located parallel to each other, vibration of the base structure normal to a tangential plane at the apex of the concave surface alternately causes compression and expansion of the small volume of air between these two surfaces. At a sufficiently high frequency of vibration, viscous forces prevent the air between the two surfaces from moving in and out, except a small amount at the edges during a cycle of vibration. There is instead a cyclic compression and decompression of the gas between the surfaces 11B and 15. The relationship between pressure and volume of the gas interspace between these surfaces, in accordance with the foregoing Boyle's law, is not linear. Accordingly, the average pressure during the compression half cycle of the vibration of the base is greater than the average pressure during the decompression half cycle of the vibration of base 12. The mean pressure thus developed, when averaged over one complete cycle of vibration, is positive relative to the ambient pressure and the surface 11B of the gyroscope rotor is moved away from the vibrating base 12. This force is proportional to the area of the surface and to the difference between the mean interval pressure and the ambient pressure, and it overcomes the weight of the gyroscope rotor 11. It is accordingly supported on a thin film of air. The rotor supported on the film of air is spinning at a high rate of speed. Viscous friction is present between the surfaces 11B and surface 15.

The drive shaft 13 of the gyroscope, as depicted symbolically in FIG. 4, is in effect coupled to the earth. The spinning rotor 11 is not coupled to the vertically positioned drive shaft 13 except for the viscous friction present. If no viscous friction forces were present, and the rotor were perfectly balanced, the spin axis 21 of the spinning rotor 11 would maintain its original position indefinitely in spite of the earth's rotation. The viscous friction which is present, however, develops a lag angle which is proportional to the magnitude of the principal moments of inertia of the spinning gyroscope rotor, and inversely proportional to the coefficient of viscous friction between the gyroscope rotor and the drive shaft. This lag angle $\theta$ may be appreciated by reference to FIG. 4.

In FIG. 4 it is assumed that the meridian-seeking gyroscope of this invention is initially located at point No. 1. As the earth rotates the individual velocity vectors of the gyroscope rotor, $V_R$, and the drive shaft $V_S$, assume directions which are divergent from one another. This divergence results in a differential velocity vector, $V_D$. A torque, T, acting on the gyroscope rotor is developed by this differential velocity vector and the viscous friction coupling.

The torque, T, on the gyroscope rotor 11 increases as the angle between the rotor spin velocity vector, $V_R$, and the drive shaft spin velocity, $V_S$, increases. This torque induces a precessional movement of the rotor 11, parallel to the earth's velocity vector, $\omega$, about an axis through its center of gravity and orthogonal to its spin velocity vector, $V_R$. It would thus appear to an observer in space that the rotor 11 at point No. 2 on the equator plane has tilted from its original position at point No. 1.

Once the rotor 11 has tilted or precessed about the north-south axis until its precessional velocity equals the horizontal component of the earth's spin velocity, the lag angle $\theta$ stays constant. This lag angle $\theta$ is in the east-west plane, and is a tilt of the rotor 11 in the westerly direction. This tilt in the westerly direction may be observed by any conventional read out systems such as components 7 and 20 shown in FIG. 1.

Read out systems suitable for determining the lag angle $\theta$ are well known and need not be described in detail. In general such a readout system operates in the manner depicted in FIG. 4A, and includes an autocollimator 20 having a prism lens 80 which directs a spot of light from a miniature light bulb 81 onto the mirror surface 82 located on the flat portion of the gyroscope rotor 11. Mirror 82 reflects the light shown as ray 83 back to a screen 84 of the autocollimator 20. Screen 84 and associated optics not shown make this spot of light visible to a viewer looking in at eyepiece 85. Screen 84 may normally include a right-angle cross hair arrangement shown at 89. The intersection of the cross hair coincides with the reflected spot of light 83 while the rotor is spinning in contact with drive shaft 13 prior to vibration of base 12 and while mirror 62 and autocollimator 20 are horizontal.

Energization of the ceramic cylinder 30 causes base 12 to vibrate and support the spinning rotor on a film of air as previously described. A lag angle develops. This lag angle tilts the rotor 11 and the mirror 82 as shown by dashed lines in FIG. 4A. This tilt directs the light path in the manner also shown by dashed lines with the result being that the spot of light has moved away to spot 87 an amount proportional to the lag angle. The autocollimator 20 is rotated until the east-west line of the cross hair is aligned to coincide with spot 87, as shown dashed at 88. The optical axis 90 of the telescope is thus aligned in the east-west plane with the viewing end of telescope 7 pointing east.

Light bulb 81 also illuminates a circular scale 91 which is located below microscope lens 92. Details of the scale 91 and the microscope operation are discussed in full in the foregoing referenced patent application and need not be repeated here.

Basically, however, the microscope through lens 92 and other optics (not shown) presents two images to the viewer. One image is the cross hairs with the spot of light 87 aligned in the east-west plane as described, and the other image is the portion of scale 91 immediately below lens 92. This scale includes suitable markings such as degrees and subdivisions thereof. The image of scale 91 may be read at this position, which reading is the east direction. From this reading, north may be calculated, or the azimuth of another object may be obtained by rotating the telescope 7 until the object under observation is viewed and another scale reading obtained.

It is to be understood that the foregoing features and principles of this invention are merely descriptive, and that many departures and variations thereof are possible by those skilled in the art, without departing from the spirit and scope of this invention.

What is claimed is:

1. A direction indicating gyroscope of the nonpendulous type comprising:
    a housing sealably enclosing a substantially static fluid environment;
    a rotor support positioned for mounting on a frame located within the housing;
    a gyroscope rotor movably seated for universal movement on said support when liftingly supported therefrom in a vertical direction;
    a motor housed by the frame, said motor having a rotatable shaft connected to said rotor support, said shaft having a vertically aligned spin axis;
    power means for said motor for rotating said shaft, said support, and said rotor about said spin axis at a predetermined speed, said rotor being responsive to coulomb friction between said support and said rotor for spinning about said vertically aligned spin axis at substantially the rotation speed of said shaft;
    a vibratory means coupled to the support and adapted for rotation with said rotatable shaft;
    a high frequency signal source having an output signal selected from the upper sonic to ultrasonic range;
    means applying said selected frequency output signal to said vibratory means for liftingly supporting said rotor, said vibratory means being responsive to said high frequency signal for vibrating said rotating support coaxially with the spin axis to periodically compress and expand a film of fluid which is substantially confined and free from net turbine movement in the space between said rotating support and said lifted spinning rotor; and
    said spinning rotor when supported on said trapped film of fluid being predominately responsive to a torque resulting from viscous friction present in the fluid film and the horizontal component of the earth's spin velocity for tilting in a westerly direction.

2. A direction indicating gyroscope in accordance with claim 1 wherein:
    said vibratory means is coupled to the rotor support at a nodal point for the composite structure formed by the support and the vibratory means, said composite structure exhibiting a natural axial frequency; and
    said high frequency output signal is selected from said frequency range to match said natural axial frequency.

3. A gyroscope in accordance with claim 2 wherein:
    said motor shaft is hollow;
    said vibratory means comprises a piezoelectric element housed in the hollow of said shaft and coupled to an end of said support that is also coupled to said shaft; and
    said selected frequency is matched to the combined lowest natural axial frequency for said support and said piezoelectric element.

4. A gyroscope in accordance with claim 1 wherein:
    said vibratory means is a piezoelectric element;
    said piezoelectric element comprising:
        a hollow ceramic cylinder;
        at least a pair of electrodes of highly conductive material one each plated on one each of the ends of said ceramic, said plated electrode pair extending a predetermined distance axially along the outer and inner surfaces of said hollow ceramic; and
        said frequency output signal applying means comprises connecting means from said high frequency signal source to said extended portions of said plated electrode pair for providing vibration inducing energy to said ceramic cylinder.

5. A gyroscope in accordance with claim 1 wherein:
    said vibratory means is a piezoelectric element;
    said piezoelectric element comprising:
        at least one ceramic disc;
        a pair of electrodes of highly conductive material one each plated on one each of the ends of said ceramic, said plated electrode pair extending a predetermined distance axially along the outer surface of said ceramic disc; and
        said frequency output signal applying means comprises connecting means from said high frequency signal source to said extended portions of said plated electrode pair for providing vibration inducing energy to said ceramic disc.

6. A gyroscope in accordance with claim 1 wherein:
    said housing is filled with a substantially static gas; and
    said fluid film is a gas film that exhibits substantially trapped compressive and expansive movement in the space between the rotor and the support, and further exhibits a limited high frequency movement in and out of said space only at the edge thereof.

7. A gyroscope in accordance with claim 1 wherein said vibratory means is a piezoelectric ceramic cylinder having one end coupled to said rotor support, said cylinder and said rotor support forming a transducer of composite structure, and means on said transducer for mounting said transducer on said shaft at a nodal point for a quarter-wave axial vibratory movement.

8. A gyroscope in accordance with claim 1 wherein said vibratory element is a piezoelectric cylinder having one end coupled to said support and the remaining end coupled to a rigid backing plate, said cylinder, said support, and said backing plate forming a transducer of composite structure, said backing plate and said support each having means for mounting said transducer on opposite ends of said shaft for half-wave axial vibratory movement.

9. A gyroscope in accordance with claim 1 wherein:
said rotor comprises a thin flat circular disc having substantially hemispherical surface protrusions on opposite sides of the disc at the disc's center and a thickened rim at the disc's periphery; and
said support has an upper concave surface concentric with and substantially the same radius of curvature as said lower hemispherical surface protrusion of said rotor, said concave surface and said hemispherical surface being normally contiguously and coaxially positioned in opposed surface relationship.

References Cited

UNITED STATES PATENTS

| | | | |
|---|---|---|---|
| 2,044,899 | 6/1936 | Carter | 33—226 |
| 3,018,142 | 1/1962 | Warnock | 308—9 |
| 3,171,696 | 3/1965 | Houghton | 308—9 X |
| 3,239,283 | 3/1966 | Broeze | 308—9 |
| 3,283,408 | 11/1966 | Rothe et al. | 33—72 |
| 3,283,409 | 11/1966 | Rothe et al. | 33—72 |

C. J. HUSAR, *Primary Examiner.*

U.S. Cl. X.R.

33—266; 308—1

PO-1050
(5/.9)

UNITED STATES PATENT OFFICE
CERTIFICATE OF CORRECTION

Patent No. 3,448,623          Dated  June 10, 1969

Inventor(s)   Joachim W. Fischer

It is certified that error appears in the above-identified patent and that said Letters Patent are hereby corrected as shown below:

In the specification, column 1, line 69, "spheircal" should be --spherical--. Column 2, line 29, "piepoelectric" should be --piezoelectric--; line 35, "pieloelectric" should be --piezoelectric--; line 57, "in" should be --is--. Column 3, line 53, "of" should be --or--. Column 5, line 40, "of" should be --or--; line 42, "range" should be --rings--; line 62, "smultaneous" should be --simultaneous--; line 73, after "of", second occurrence, insert --state of--; line 74, "law" should be --Law--. Column 6, line 13, "law" should be --Law--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents